_United States Patent_ [19]

Tsuneki et al.

[11] 4,065,387

[45] Dec. 27, 1977

[54] SLIME CONTROL METHOD

[75] Inventors: Takao Tsuneki, Ebina; Norio Takahashi; Hirohisa Tashiro, both of Yokohama, all of Japan

[73] Assignee: Kurita Water Industries, Ltd., Osaka, Japan

[21] Appl. No.: 683,249

[22] Filed: May 5, 1976

[30] Foreign Application Priority Data

May 14, 1975 Japan .................................. 50-57691

[51] Int. Cl.$^2$ ................................................ C02B 1/36
[52] U.S. Cl. ...................................... 210/62; 162/161; 210/64
[58] Field of Search ............... 71/67; 162/161, 181 A, 162/190; 210/59, 62, 63, 64; 424/127

[56] References Cited

U.S. PATENT DOCUMENTS

| | | | |
|---|---|---|---|
| 3,082,146 | 3/1963 | Wentworth et al. | 210/59 |
| 3,222,276 | 12/1965 | Belohlau et al. | 210/62 |
| 3,316,173 | 4/1967 | Mills et al. | 210/64 |
| 3,658,700 | 4/1972 | Lederer | 162/161 |

OTHER PUBLICATIONS

Johnson, Disinfection—Water & Waste Water, 1975, pp. 179–191.

_Primary Examiner_—Charles N. Hart
_Assistant Examiner_—Peter A. Hruskoci
_Attorney, Agent, or Firm_—Blanchard, Flynn, Thiel, Boutell & Tanis

[57] ABSTRACT

The present invention relates to a slime control agent comprising a bromite substance as an effective component, and a method of controlling the formation of slime by adding a bromite substance to water systems at a rate of 1 to 200 ppm.

8 Claims, No Drawings

SLIME CONTROL METHOD

BACKGROUND OF THE INVENTION a. Field of the Invention

The present invention relates to a slime control agent for controlling the formation of slime in water systems wherein the slime is covered mainly by the deposition of microorganisms, and a method of using the agent.

b. Description of the Prior Art

In industrial water systems such as cooling water systems, paper mill water systems, and the like, there takes place the formation of slime caused by the deposition of microorganisms, inorganic substances and organic substances.

In the case of circulating cooling water systems, slime containing various microorganism forms on the surface of a pipeline and/or a heat-exchange section thereby causing such troubles as clogging of the pipeline and lowering of the heat conductivity in the heat. In water systems for paper mills, the formation of slime cause such troubles as frequent breakouts of the paper and remarkable degradation of the quality of the paper product. Further, there takes place much slime formation in waste water and other water systems. In these water systems, therefor, it is necessary to control the formation of slime.

To prevent the foregoing troubles ascribable to slime formation, a biocide such an organo-metallic compound, a heavy metallic compound, a cationic surface active agent, an inorganic chlorine, an organo-chlorine compound or the like has hitherto been used as a slime control agent. However, a biocide effective for controlling the formation of slime generally possesses a high toxicity and therefore use thereof is undesirable from the view point of the prevention of environmental pollution.

SUMMARY OF THE INVENTION

An object of the present invention is to provide a method for using a slime control agent which demonstrates an excellent efficiency in controlling the formation of slime when added to water systems at a low concentration.

A further object of the present invention is to provide a method for using a slime control agent which is low in toxicity, easy to decompose and free from causing environmental pollution.

According to the present invention, slime formation can be prevented without killing microorganisms with a biocide.

On the surface of microorganisms or a floc consisting of an aggregation of microorganisms, there is a sticky substance as an extracellular matrix which is apt to adhere to the surfaces of solids, and this is the cause of slime formation.

The formation of slime can be prevented without killing microorganisms when the sticky substance is changed in quality or is removed thereby to eliminate the adhesiveness of the microorganisms to solid surfaces.

The slime control agent according to the present invention comprises a bromite substance as an effective component.

As bromite substances the present invention, there are water soluble bromites such as sodium bromite (NaBrO$_2$), potassium bromite (KBrO$_2$) or the like.

Water systems to which the slime control agent is applicable include, for instance, industrial water, river water, sea water, waste water, sewage, etc. To give concrete examples of applicable water systems, there are open- or closed-type circulating cooling water systems, paper-mill water systems in, for instance, the paper making process and the white-water recovering process, etc. An aqueous solution of commercially available bromite may be used in the original or diluted state. The bromite solution may be added either continuously or intermittently to the water system. The bromite substance is usually used in amounts of 1 to 200 parts per million parts by weight of water in the system. For example the bromite substance is added in the range of from 1 to 50 ppm preferably from 3 to 10 ppm, in the case of a cooling water system, and in the range of 3 to 200 ppm, preferably 3 to 100 ppm, in the case of a paper-mill water system. Such a low concentration of the agent prevents slime formation effectively.

The slime control agent of the present invention eliminates the adhesiveness of microorganisms and/or the adhesiveness of flocs of microorganisms by changing the nature of the sticky substances of the extracellular matrix through oxidation with the bromite. This is quite different from the effects of chelating agents or cationic surface active agents.

It is a common knowledge that chemicals having a strong oxidizing power are strong in biocidal power. Chlorine, hypochlorite, chlorite, chlorate, bromine, iodine, and the like are well known as biocides as well as slime control agents. On the contrary, a bromite substance has never been utilized as a biocide or a slime control agent because a bromite is very weak in biocidal power compared with the foregoing oxidizing agents.

Bromite substances used in the present invention demonstrate a high efficiency in controlling the formation of slime when employed in a low range of concentration as set forth above. In the case of such a low concentration, the bromite substance cannot manifest the effect of killing microorganisms, and accordingly the slime control effect of the bromite is not attributable to a biocidal action.

The slime control agent according to the present invention has excellent characteristic features compared with conventional biocide-type slime control agents, such as it is low in toxicity, easy to decompose and free from causing environmental pollution.

When the present slime control agent is applied to the paper manufacturing process, it displays a mighty effect of controlling the formation of slime without causing any change in the quality of the paper product.

The present slime control agent may be used jointly with other slime control agents such as biocides or with other water-treating agents such as corrosion inhibitors, scale inhibitors, etc. as long as it does not depart from the objects of the present invention.

DESCRIPTION OF THE PREFERRED EMBODIMENTS

EXAMPLE 1

By using a model plant employing a circulating cooling water system of the following scale, the slime control effect of sodium bromite was examined.

hold water volume:1,300 l—water temperature of cooling tower inlet: 31°-22° C circulating rate:1,000 l/hr—water temperature of cooling tower outlet: 21°-22° C make-up rate: 36 l/hr—flow rate within heat exchange pipe: 0.3 m/sec process side temperature: 40° C—gross heating surface area: 1.05 m²

In order to carry out an experiment using the above cooling water system in a short period of time, water having a turbidity of 50° prepared by suspending slime deposited on a heat exchanger of an oil refinery (the slime mainly consisting of zoogloea) was employed as makeup water. After 7 days' operation of said cooling water system wherein sodium bromite was added to the circulating water as the slime control agent, slime was picked from a fixed place of the heat exchanger. The slime control effect of the sodium bromite was examined by measuring the dry weight of the slime in comparison with the amount of slime formed in a comparative circulating water containing no sodium bromite (blank) and expressing the results as a percentage. This percentage is hereinafter referred to as 'deposition rate'. The result was as shown in the following Table-1.

Table-1

| Concentration of slime control agent (ppm) | Deposition rate (%) |
| --- | --- |
| 0 (blank) | 100 |
| 1 | 52 |
| 3 | 28 |
| 5 | 18 |
| 7 | 17 |

When the deposition rate was less than about 30%, the formation of slime was not observed externally.

As is clear from the showing in the above table, sodium bromite added in an amount of 1 ppm displayed about 50% of slime control effect compared with the blank. This slime control effect was further improved when the amount of sodium bromite was more than 3 ppm.

In the present example, there was observed no decrease of bioable cell number at all within the circulating water containing sodium bromite. This verifies that the slime control effect of the present invention is not attributable to a biocidal action.

EXAMPLE 2

14 l of white water obtained from a paper machine for producing white cardboard were charged into a test channel equipped with a white-water circulating apparatus and having a hold water volume of 14 l. A slime-board (i.e., water-proof, veneer board having a size of 10 cm × 10 cm) was dipped into the white water and the white water was circulated for 2 days. The amount of slime deposited on the slime-board was measured. Then a solution of sodium bromite as slime control agent was added to the channel so as to attain a fixed concentration and the water system was operated batchwise.

In order to shorten the duration of the experiment, the experiment was conducted under a condition convenient for depositing slime by adding 50 ppm of corn steep liquor.

The slime deposition rate compared with the blank was calculated from the amount of slime deposited on the board. The results were as shown in the following Table-2.

Table-2

| Applied amount of the present slime control agent (ppm) | Deposition rate (%) |
| --- | --- |
| 0 (blank) | 100 |
| 0.5 | 72.8 |
| 1.0 | 49.9 |
| 3.0 | 28.0 |
| 5.0 | 9.7 |

When the slime deposition rate was 49.9%, deposition of slime was scarcely observed externally, and when the slime deposition rate was 28.0%, deposition of slime was not entirely observed externally. When the bioable cell number was examined at the same time by the plate culture method employing bouillon agar medium, no significant difference was observed in all cases. Accordingly, it is evident that the slime control effect of the present slime control agent is not attributable to a biocidal action.

EXAMPLE 3

In a paper mill for newsprint, a comparative experiment was conducted using a slime control agent according to the present invention and a conventional slime control agent. As the slime control agent according to the present invention, a solution of sodium bromite was employed, while as the conventional slime control agent, methylene bisthiocyanate was employed. The slime control agents were respectively put in the water system through intermittent supply process, that is, by pouring continuously for 4 hours so as to attain a concentration of 30 ppm therein, and after discontinuing the pouring for 8 hours subsequent thereto, again pouring for 4 hours in the same way, followed by discontinuation of pouring for another 8 hours. Appraisal of the effect of the agent was performed by comparing the frequency of breakout of paper. The results were as shown in the following Table-3.

Table-3

| Number of days after starting operation | Frequency of breakout of paper (times/day) | |
| --- | --- | --- |
| | conventional slime control agent | present slime control agent |
| 1 day after | 2.6 | 4 |
| 3 days after | 2.1 | 2 |
| 5 days after | 2.3 | 2 |
| 7 days after | 3.9 | 3 |
| 10 days after | 6.8 | 3 |
| 14 days after | — | 5 |

As is clear from the showing in Table-3 above, in the case of the conventional slime control agent, the frequency of the breakout of paper increased from about 7 days after starting the operation, and the inside of the water system had to be cleaned every 10 days. The formation of slime was mainly observed on the wall of stock inlet. On the contrary, in the case of a slime control agent according to the present invention, there was no increase of the frequency of the breakout of paper until 10 days after starting the operation, and even 14 days after starting the operation, there was no need for cleaning the inside of water system. The amount of slime deposited on the surface of the wall of stock inlet was trifling.

When the quality of a wood free paper (i.e., coated paper) manufactured by applying a slime control agent according to the present invention was compared with a comparative wood free paper (coated paper) manufactured without applying any slime control agent, there was observed no difference at all in the 'brightness by Hunter', stöckigt sizing degree, bursting resistance, tear resistance, folding endurance and tensile strength.

What is claimed is:

1. A method for reducing the amount of slime that adheres on solid surfaces in contact with a circulating stream of process water wherein said process water contains microorganisms capable of forming and depositing a slime on said surfaces, which comprises the step of: adding to said circulating stream of process water from 1 to 200 ppm of a water-soluble bromite compound selected from the group consisting of sodium bromite and potassium bromite so that said bromite compound is effective to reduce the adhesion of slime on said solid surfaces.

2. A method as claimed in claim 1 in which said circulating stream of process water is an industrial cooling water.

3. A method as claimed in claim 2 in which the amount of said bromite compound is from 1 to 50 ppm.

4. A method as claimed in claim 2 in which the amount of said bromite compound is from 3 to 10 ppm.

5. A method as claimed in claim 1 in which said circulating stream of process water is an industrial paper-making process water.

6. A method as claimed in claim 5 in which the amount of said bromite compound is from 3 to 200 ppm.

7. A method as claimed in claim 5 in which the amount of said bromite compound is from 3 to 100 ppm.

8. A method according to claim 1, wherein bromite is added to the water either continuously or intermittently.

* * * * *